United States Patent
Kelly et al.

(10) Patent No.: US 7,920,017 B2
(45) Date of Patent: Apr. 5, 2011

(54) PROGRAMMABLE CLOCK BOOSTER SYSTEM

(75) Inventors: Daniel F. Kelly, Andover, MA (US);
Lawrence A. Singer, Burlington, MA (US)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 11/305,540

(22) Filed: Dec. 16, 2005

(65) Prior Publication Data

US 2006/0186948 A1 Aug. 24, 2006

Related U.S. Application Data

(60) Provisional application No. 60/636,725, filed on Dec. 16, 2004.

(51) Int. Cl.
*G05F 1/10* (2006.01)
*G05F 3/02* (2006.01)

(52) U.S. Cl. .................................. 327/536
(58) Field of Classification Search .................. 327/536
See application file for complete search history.

(56) References Cited

U.S. PATENT DOCUMENTS

| | | | |
|---|---|---|---|
| 5,280,420 A * | 1/1994 | Rapp | 363/60 |
| 5,563,779 A * | 10/1996 | Cave et al. | 363/59 |
| 5,589,785 A | 12/1996 | Garavan | |
| 5,714,906 A | 2/1998 | Motamed et al. | |
| 5,877,948 A * | 3/1999 | Dijkmans | 363/60 |
| 6,424,570 B1 * | 7/2002 | Le et al. | 365/185.18 |
| 6,466,079 B1 * | 10/2002 | Kushnarenko | 327/536 |
| 6,504,431 B2 | 1/2003 | Weber et al. | |
| 6,577,185 B1 | 6/2003 | Chandler et al. | |
| 6,621,315 B2 * | 9/2003 | Heo et al. | 327/158 |
| 6,677,822 B2 | 1/2004 | Hasegawa | |
| 6,724,241 B1 * | 4/2004 | Bedarida et al. | 327/536 |
| 6,737,912 B2 * | 5/2004 | Otsuka | 327/566 |
| 6,756,842 B2 | 6/2004 | Mehr et al. | |
| 6,891,433 B2 | 5/2005 | Schrader | |
| 6,975,161 B2 * | 12/2005 | Yen | 327/536 |
| 7,042,289 B2 | 5/2006 | Hwang et al. | |
| 7,049,889 B2 | 5/2006 | Kalb | |
| 7,053,711 B2 | 5/2006 | Bogner | |

* cited by examiner

*Primary Examiner* — Quan Tra
(74) *Attorney, Agent, or Firm* — Kenyon & Kenyon LLP

(57) ABSTRACT

A programmable clock booster system including a clock booster circuit including at least one boost capacitor connected between a first node and a second node for sampling an input voltage in a first phase and applying a boosting voltage to said second node during a second phase, and a programmable capacitor circuit connected to said first node for providing a programmable boosted voltage on said first node during said second phase.

32 Claims, 13 Drawing Sheets

PROGRAMMABLE CLOCK BOOSTER SYSTEM

RELATED APPLICATIONS

This application claims priority of U.S. Provisional Application No. 60/636,725 filed Dec. 16, 2004, incorporated by reference herein.

FIELD OF THE INVENTION

This invention relates to an improved programmable clock booster system.

BACKGROUND OF THE INVENTION

Many electrical circuits require voltages to be boosted higher than the supply voltage of the circuit. One prior art method to provide a boosted voltage is a switched capacitor voltage doubler circuit. This method samples an input voltage, e.g., the supply voltage, on a capacitor during one phase and then connects the capacitor in series with the input voltage during a second phase to create a boosted output voltage at the top plate of the capacitor is equal to twice the input voltage. This same circuit is often used as a clock booster by connecting the capacitor in series with a clock voltage during the second phase. Because prior art clock boosters or voltage doublers are designed to boost the output voltage to double the supply voltage, they do not provide a boosted voltage that is between the supply voltage and double the supply voltage that may be useful in many designs.

This problem can be resolved with a variation of the voltage doubler by sampling the supply voltage, e.g., $V_{DD}$, on the capacitor in the first phase and then connecting the capacitor in series with a boosting voltage in the second phase so that the top plate of the capacitor is boosted to the sum of the supply voltage, $V_{DD}$, and the boosting voltage. Conversely, a boosting voltage can first be sampled on the capacitor in the first phase and then the capacitor is connected in series with the supply voltage, $V_{DD}$, in the second phase so that the boosted output is the sum of the supply voltage, $V_{DD}$, and the boosting voltage. However, such a design requires a second low impedance voltage source to provide the boosting voltage and this requires extra power.

Another approach is to add an attenuator capacitor to a conventional voltage doubler circuit. In this approach, the attenuator capacitor is connected to the top plate of the boost capacitor. During the first phase, the input voltage, e.g., $V_{DD}$, is sampled on the boost capacitor. During the second phase, $V_{DD}$ is connected to the bottom plate of the boost capacitor. The voltage at the top plate of the boost capacitor is attenuated by the capacitive divider action of the boost capacitor and the attenuator capacitor. The result is that the boosted output voltage at the top plate of the boost capacitor is between $V_{DD}$ and two times $V_{DD}$, as determined by the capacitor values of the boost capacitor and the attenuator capacitor. The advantage of this approach is that only a single low impedance input voltage, e.g., $V_{DD}$, is needed. However, the circuit relies on selecting the attenuating capacitor for a specific desired boosted output voltage and therefore does not provide a programmable boosted output voltage.

It is often desirable to use a series-pass switch at the output of a typical clock booster or voltage doubler circuit so that the boosted voltage is allowed to pass to the output only during the boosted phase, e.g., in the second phase. Such a switch must be on during the boosted phase and off during the charging phase, e.g., the first phase. Prior art boosters typically employ a PMOS series-pass switch with the gate of the series-pass switch tied to a fixed voltage, typically $V_{DD}$, and the source tied to the boosted voltage node. Thus, when the boosted voltage node rises sufficiently above the supply, the PMOS series-pass switch turns on and the boosted voltage passes to the output. When the boosting voltage node drops below $V_{DD}$ plus the threshold voltage, $V_T$, the PMOS switch shuts off. However, conventional booster circuits are not designed to adjust or program the voltage at the gate of the series-pass switch to ensure the series-pass switch is off in one phase and on in another phase. Conventional clock booster circuits also cannot program the boosted voltage required to enable the series-pass switch over a range of programmable boost voltages.

BRIEF SUMMARY OF THE INVENTION

It is therefore an object of this invention to provide an improved programmable clock booster circuit system.

It is a further object of this invention to provide such a programmable clock booster system which eliminates the need for additional low impedance or buffered input voltages other than the supply voltage.

It is a further object of this invention to provide such a programmable clock booster system which provides a programmable boosted voltage.

It is a further object of this invention to provide such a programmable clock booster system which may include a programmable voltage controlled series-pass switch that passing a programmable boosted voltage to the output node only when the switch is enabled.

It is a further object of this invention to provide such a programmable clock booster system which can adjust and program the control voltages required to enable and disable the series-pass switch.

It is a further object of this invention to provide such a programmable clock booster system which adjusts the voltage at the gate of the series-pass switch to ensure the series-pass switch is on in one phase and off in another phase.

It is a further object of this invention to provide such a programmable clock booster system which is less complex.

This invention results from the realization that an improved clock booster system that provides a programmable boosted voltage is effected with a clock booster circuit that includes a boost capacitor connected between a first node and a second node that samples an input voltage in a first clock phase and applies a boosting voltage to the second node in a second phase, and a programmable capacitor circuit connected to the first node that provides a programmable boosted voltage on the first node during the second phase that is between the input voltage and the sum of the input voltage and the boosting voltage. This invention results from the further realization that an improved clock booster system that includes a series-pass switch connected to a capacitor circuit is effected with a gate drive circuit connected to a gate of the series-pass switch that adjusts the voltage at the gate to a predetermined voltage that disables the series-pass switch in a first phase and that adjusts the voltage at the gate to a reduced voltage that ensures the series-pass switch is enabled in a second phase.

The subject invention, however, in other embodiments, need not achieve all these objectives and the claims hereof should not be limited to structures or methods capable of achieving these objectives.

This invention features a programmable clock booster system including a clock booster circuit including at least one boost capacitor connected between a first node and a second node for sampling an input voltage in a first phase and applying a boosting voltage to the second node in a second phase, and a programmable capacitor circuit connected to the first node for providing a programmable boosted voltage on the first node during the second phase.

In a preferred embodiment, the programmable boosted voltage is between the input voltage and the sum of the input voltage and the boosting voltage. The programmable capacitor circuit may include a capacitor array including at least two switched capacitors. The programmable boosted voltage may be determined by the capacitance of the at least one boost capacitor and the total capacitance of the enabled capacitors of the capacitor array. The system may further include a series-pass switch connected to the programmable capacitor circuit for preventing the programmable boosted voltage to pass to an output node in the first phase and allowing the boosted voltage to pass to the output node in the second phase. The series-pass switch may include a voltage controlled switch responsive to a control voltage that enables or disables the series-pass switch. The series-pass switch may also include at least one transconductance component chosen from the group consisting of a PMOS device and an NMOS device. The series-pass switch may include a PMOS device. A predetermined voltage may be applied to a gate of the PMOS device that ensures the PMOS device is off in the first phase and on in the second phase. The system may further include a gate drive circuit connected to a gate of the series-pass switch for adjusting the voltage at the gate to a first predetermined voltage that disables the series-pass switch in the first phase and for adjusting the voltage at the gate to a second predetermined voltage that enables the series-pass switch in the second phase. The gate drive circuit may include a plurality of switching devices connected to a plurality of voltage sources. The gate drive circuit may include a programmable digital-to-analog converter or a resistive divider circuit. The gate drive circuit may include a voltage controlled switching device connected to the gate of the series-pass switch for setting the voltage on the gate to the first predetermined voltage in the first phase and a capacitor divider circuit connected to the gate for adjusting the voltage on the gate to the second predetermined voltage in the second phase. The capacitive divider circuit may include at least first and second capacitors. One or both of the first and second capacitors may include a programmable capacitor. The programmable capacitor may include a capacitor array having at least two switched capacitors. The second predetermined voltage may be determined by the capacitance of the first and second capacitors. The capacitance of the first and second capacitors may be chosen so that the second predetermined voltage tracks the boosted voltage. The input voltage and the capacitance of the boost capacitor, the programmable capacitor circuit and the gate drive circuit may be selected so that the gate drive circuit may generate a constant gate to source voltage on the series-pass switch over variations in the programmable boosted voltage.

This invention also features a programmable clock booster system including a clock booster circuit including at least one boost capacitor connected between a first node and a second node for sampling an input voltage in a first phase and applying a boosting the voltage at the second node in a second phase, a capacitor circuit connected to the first node for providing a variable boosted voltage between the input voltage and the sum of the input voltage and the boosting voltage. A series-pass switch connected to the programmable capacitor circuit prevents the variable boosted voltage from passing to an output node in the first phase and allows the variable boosted voltage to pass to the output node in the second phase. A gate drive circuit connected to a gate of the series-pass switch adjusts the voltage at the gate to a first predetermined voltage that disables the series-pass switch in the first phase and adjusts the voltage at the gate to a second predetermined voltage that enables the series-pass switch in the second phase.

In a preferred embodiment, the capacitor circuit may include a capacitor array including at least two switched capacitors. The variable boosted voltage may be determined by the capacitance of the at least one boost capacitor and the total capacitance of the enabled capacitors of the capacitor array. The series-pass switch may include a voltage controlled switch responsive to a control voltage that enables or disables the series-pass switch. The series-pass switch may include at least one transconductance component chosen from the group consisting of a PMOS device and an NMOS device. The series-pass switch may include a PMOS device. A predetermined voltage may be applied to a gate of the PMOS device that ensures the PMOS device is off in the first phase and on in the second phase. The gate drive circuit may include a plurality of switching devices connected to a plurality of voltage sources. The gate voltage circuit may include a programmable digital-to-analog converter or a resistive divider circuit. The gate drive circuit may further include a voltage controlled switching device connected to the gate of the series-pass switch for setting the voltage on the gate to the first predetermined voltage in the first phase and a capacitor divider circuit connected to the gate for adjusting the voltage on the gate to the second predetermined voltage in the second phase. The capacitive divider circuit may include at least first and second capacitors. One or both of the first and second capacitors may include a programmable capacitor. The programmable capacitor may include a capacitor array having at least two switched capacitors. The second predetermined voltage may be determined by the capacitance of the first and second capacitors. The capacitance of the first and second capacitors may be chosen so that the second predetermined voltage tracks the variable boosted voltage. The input voltage and the capacitance of the boost capacitor, the capacitor circuit and the gate drive circuit may be selected so that the gate drive circuit generates a constant gate to source voltage on the series-pass switch over variations in the variable boosted voltage.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
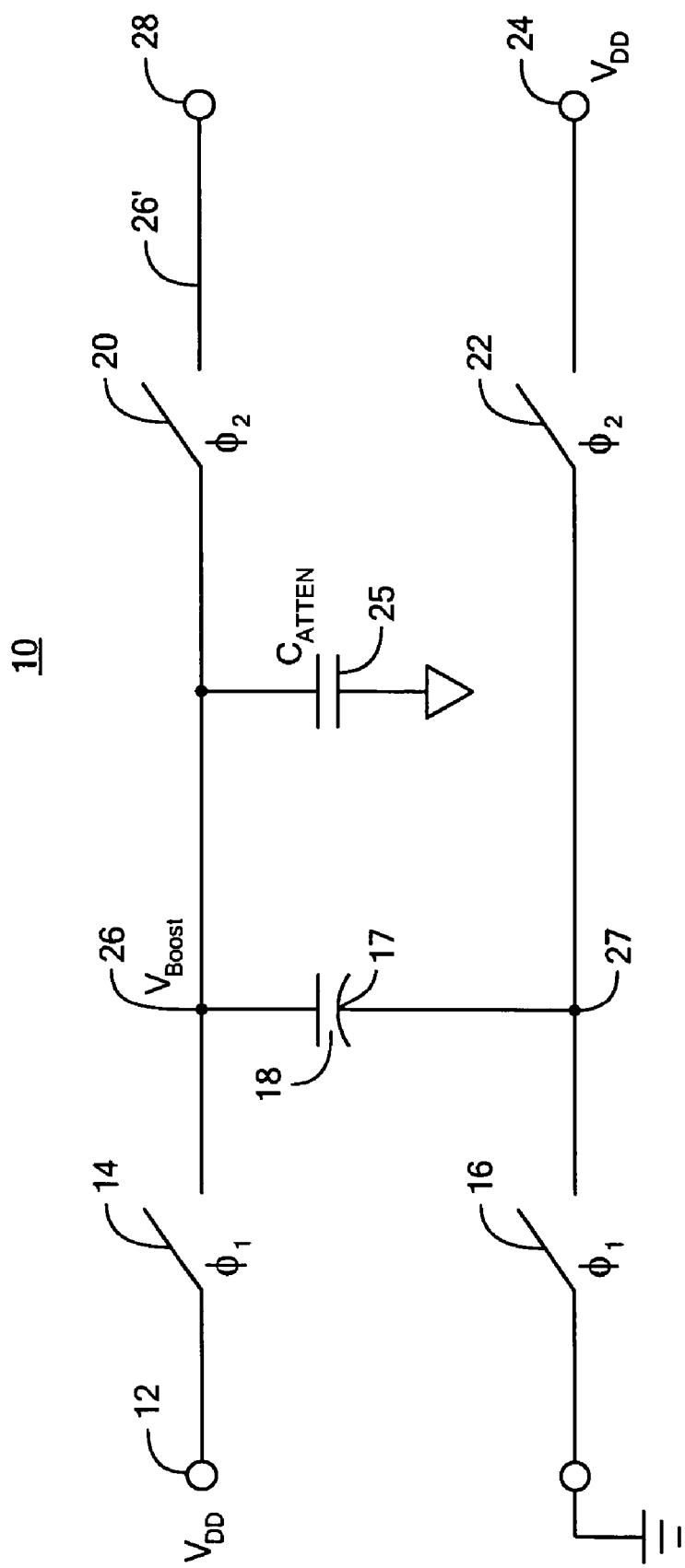
FIG. 1 is a simplified schematic circuit diagram of a typical prior art clock booster or voltage doubler.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, conventional clock booster or voltage doubler circuit 10, FIG. 1, is designed to double the input voltage $V_{DD}$ 12 by sampling input voltage $V_{DD}$ 12 in a first phase with boost capacitor 18 by closing switching devices 14 and 16 and opening switching devices 20 and 22. At the end of the first phase, switching devices 14 and 16 are opened thus sampling input voltage $V_{DD}$ 12 onto boost capacitor 18. In a second phase, switching devices 14 and 16 are open while switching devices 20 and 22 are closed connecting $V_{DD}$ 24 to bottom plate 17 of boost capacitor 18 at node 27 via switching device 22. This results in the voltage at node 26, $V_{BOOST}$, being boosted to the sum of the previously sampled input voltage $V_{DD}$ 12 and the input voltage $V_{DD}$ at 24, e.g., $V_{BOOST}$ is equal to 2 $V_{DD}$. However, because clock booster circuit 10 is designed to double the input or supply voltage, clock booster circuit 10 does not provide a boosted voltage, $V_{BOOST}$, that is between the supply voltage, $V_{DD}$, and twice $V_{DD}$, e.g., 2 $V_{DD}$, that is often useful in some designs.

When attenuating capacitor 25 is connected to clock booster circuit 10, the voltage, $V_{BOOST}$, at node 26 at the end of the second phase is less than twice the input voltage, e.g., $V_{BOOST}$ is less than 2 $V_{DD}$. During the first phase, circuit clock booster 10 operates as a conventional booster circuit and $V_{DD}$ 12 is sampled onto the boost capacitor 18. During the second phase, $V_{DD}$ 24 is applied to bottom plate 17 of boost capacitor 18 by node 27 through switch 22. The capacitive divider action of boost capacitor 18 and attenuator capacitor 25 causes the boosted voltage at node 26 to increase to value less than 2 $V_{DD}$ as determined by the capacitor values of boost capacitor 18 and attenuator capacitor 25. However, conventional clock booster circuit 10 with attenuating capacitor 25 cannot program the attenuated boosted voltage at node 26 and relies solely on selecting the capacitance of attenuating capacitor 25 and boost capacitor 18 to achieve a desired boosted voltage.

Figure 2:
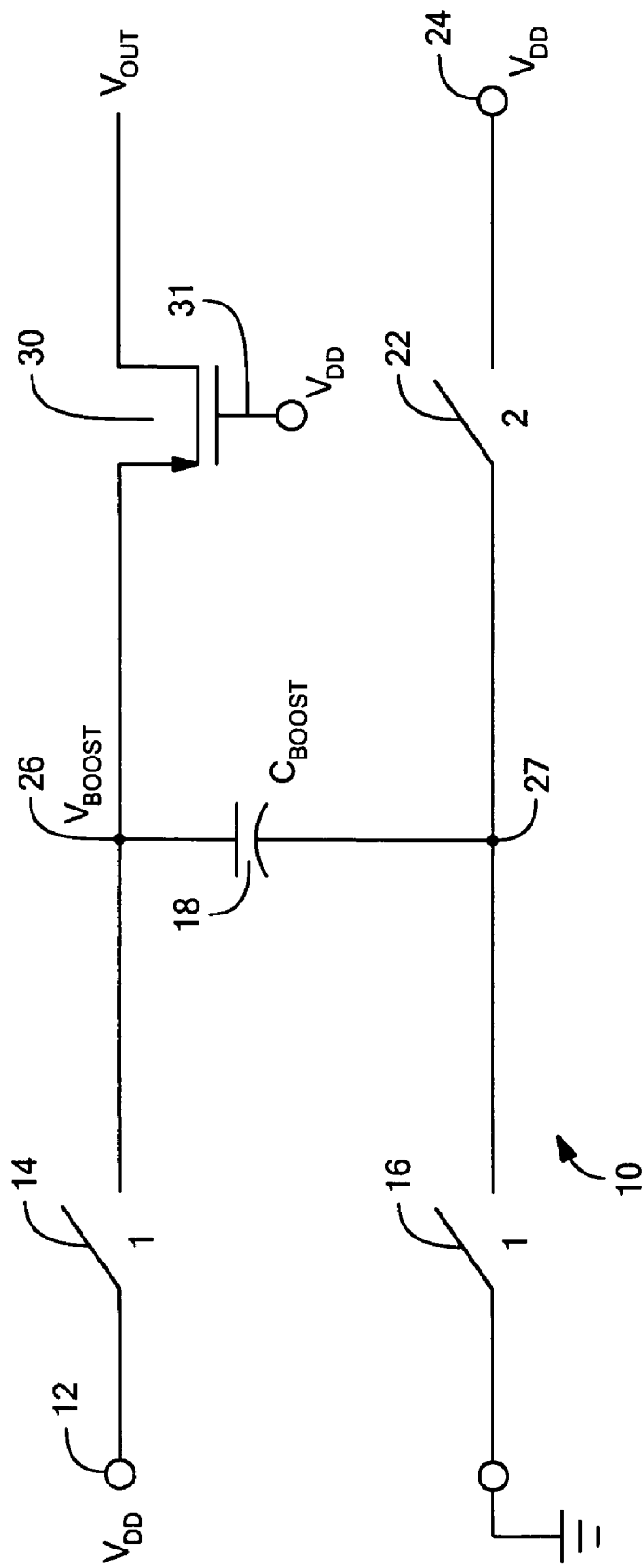
FIG. 2 is a simplified schematic circuit diagram of a typical prior art clock booster that includes a series-pass switch.

When a switch, such as series-pass switch 30, FIG. 2, where like parts have been given like numbers, is added to clock booster circuit 10, series-pass switch 30 is passively turned on by the boosted voltage, $V_{BOOST}$, at node 26 in the second phase and passively turned off when the voltage at node 26 is equal to the supply voltage, e.g., $V_{DD}$. As discussed above, conventional clock booster circuit 10 is not designed to adjust or program the voltage at gate 31 to ensure series-pass switch 30 is off in a first phase and on in a second phase.

Figure 3:
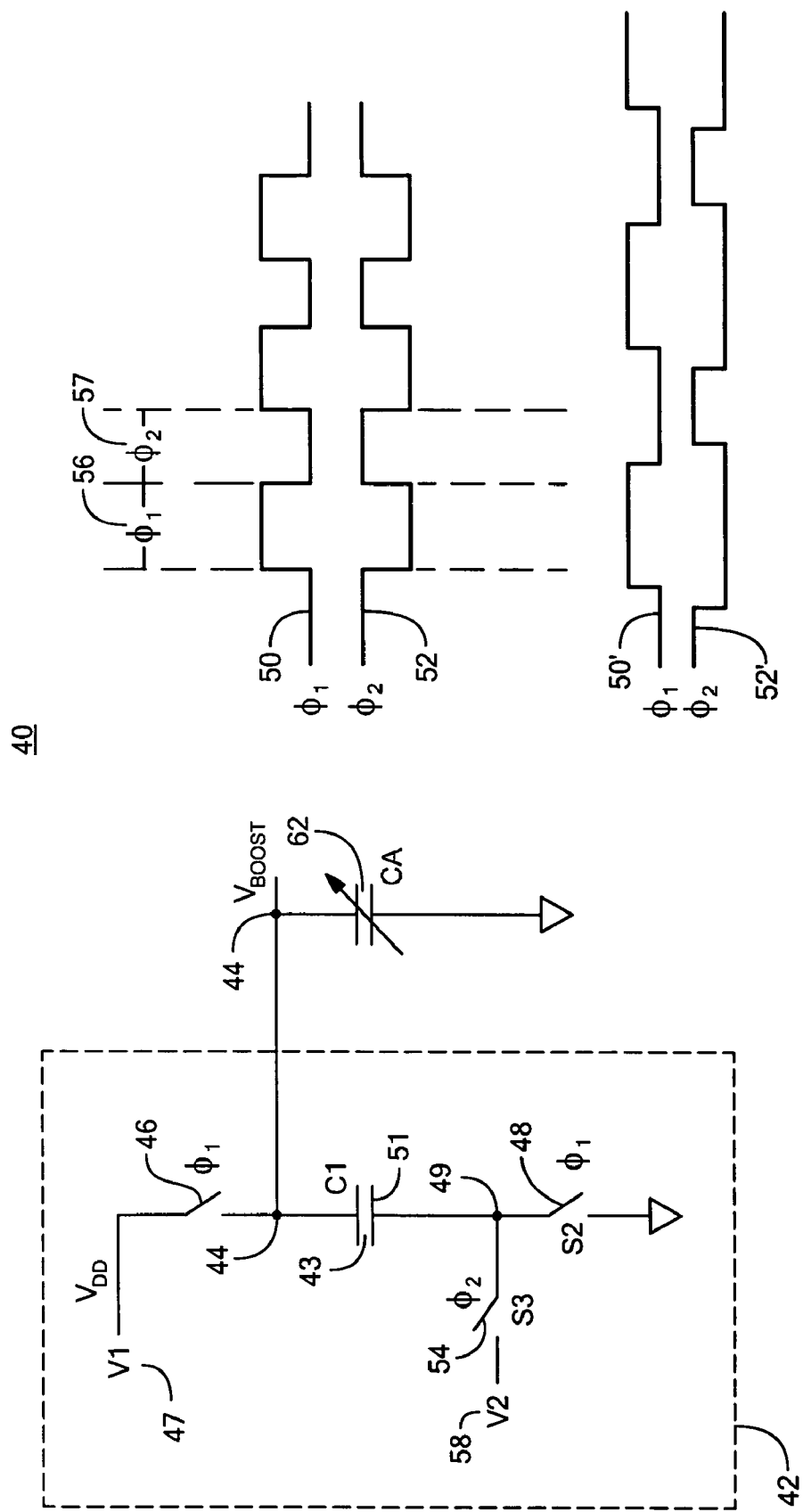
FIG. 3 is a simplified schematic circuit diagram of one embodiment of the programmable clock booster system of this invention.

In contrast, programmable clock booster system 40, FIG. 3, of this invention includes clock booster circuit 42 with boost capacitor 43 (C1) connected between node 44 and node 49 for sampling input voltage V1 47 in a first phase, $\phi_1$, and applying a boosting voltage, e.g., V2 58, to node 49 in a second phase, $\phi_2$. $\phi_1$ signal 50 and $\phi_2$ signal 52 are of opposite phase and may be aligned or non-overlapping, as shown by $\phi_1$ signal 50' and $\phi_2$ signal 52'. Switching devices 46 and 48 are responsive to $\phi_1$ signal 50 that closes switching devices 46 and 48 in $\phi_1$, indicated at 56, and switching device 54 is responsive to $\phi_2$ signal 52 that opens switching device 54 in $\phi_1$. Thus, at the end of $\phi_1$, the input voltage V1 47 is sampled by boost capacitor 43. In the second phase, $\phi_2$, indicated at 57, switching devices 46 and 48 are open and switching device 54 is closed so that the voltage V2 58, e.g., the boosting voltage, is applied to node 49 connected to bottom plate 51 of boost capacitor 43.

Programmable capacitor circuit 62 (CA), discussed below, is connected to node 44 and provides a programmable boosted voltage, $V_{BOOST}$, at node 44 during the second phase, $\phi_2$. The capacitor values of boost capacitor 43 and programmable capacitor circuit 62 can be chosen to provide any desired programmable boosted voltage, $V_{BOOST}$, at node 44 that is between the input voltage V1 47 and the sum of input voltage 47 and the boosting voltage V2 58. When V1 47 is equal to V2 58 and V1 47 and V2 58 are both equal to $V_{DD}$, $V_{BOOST}$ at node 44 can be programmed to be any desired programmable voltage between $V_{DD}$ and two times $V_{DD}$ without the need for any additional low impedance sources or buffered input voltages.

Figure 4:
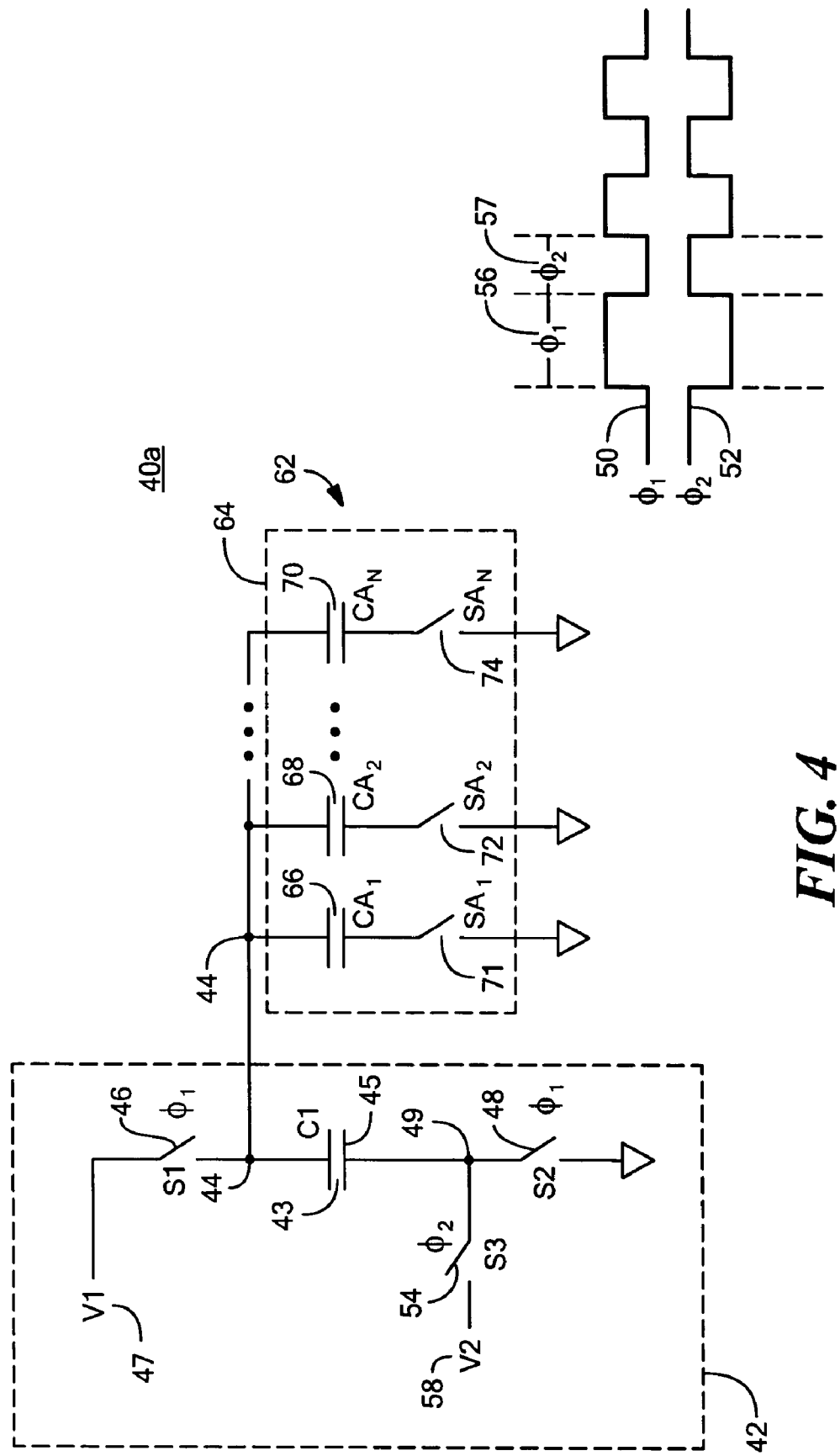
FIG. 4 is a simplified schematic circuit diagram showing one example of the programmable capacitor circuit shown in FIG. 3.

Programmable capacitor circuit 62 (CA) typically includes capacitor array 64, FIG. 4, where like parts have been given like numbers, that includes switched capacitor 66 (CA$_1$) with switching device 71 (SA$_1$), capacitor 68 (CA$_2$) with switching device 72 (SA$_2$), and capacitor 70 (CA$_N$) with switching device 74 (SA$_N$). The programmable boost voltage at node 44 is generated with capacitor array 64 by selectively enabling various switched capacitors 66-70 by closing the associated switching devices 71-74. The programmable boosted voltage at node 44 at the end of $\phi_2$ is determined by the capacitance of boost capacitor 43 and the total capacitance of the enabled switched capacitors 66-70 of capacitor array 64 as shown by the formula:

$$V_{BOOST_{\Phi2}} = V1 + V2\left(\frac{C1}{C1 + CA}\right) \quad (1)$$

where V1 and V2 are input voltages, e.g., V1 47 and V2 58, C1 is the capacitance of boost capacitor 43 and CA is the total capacitance of the enabled switched capacitors 66-70 of capacitor array 64.

In operation, as discussed above, during $\phi_1$, switching devices 46 and 48 are closed while switching device 54 is open and the voltage V1 47 is sampled at node 44. In this example switching devices 71-74 are programmed to be closed so that switched capacitors 66-70 are enabled, collectively referred to as CA, and charged to the voltage V1 47. Thus, at the end of $\phi_1$ the voltage V1 47 is sampled by boost capacitor 43 and capacitors 66-70 (CA). During $\phi_2$ switching devices 46 and 48 are open and switching device 54 is closed. Bottom plate 45 of boost capacitor 43 is driven to the voltage V2 58 and node 44 is floating. The capacitive divider action of boost capacitor 43 and the total capacitance of the enabled switched capacitors 66-70 (CA) of capacitor array 64 results in the programmable boosted voltage at node 44, $V_{BOOST\phi_2}$, that is between V1 47 and the sum of V1 47 plus V2 48, as shown by the formula (1) above. The result is that any desired programmable boosted voltage at node 44 can be achieved by selectively enabling various switched capacitors 66-70 in capacitor array 64.

Figure 5:
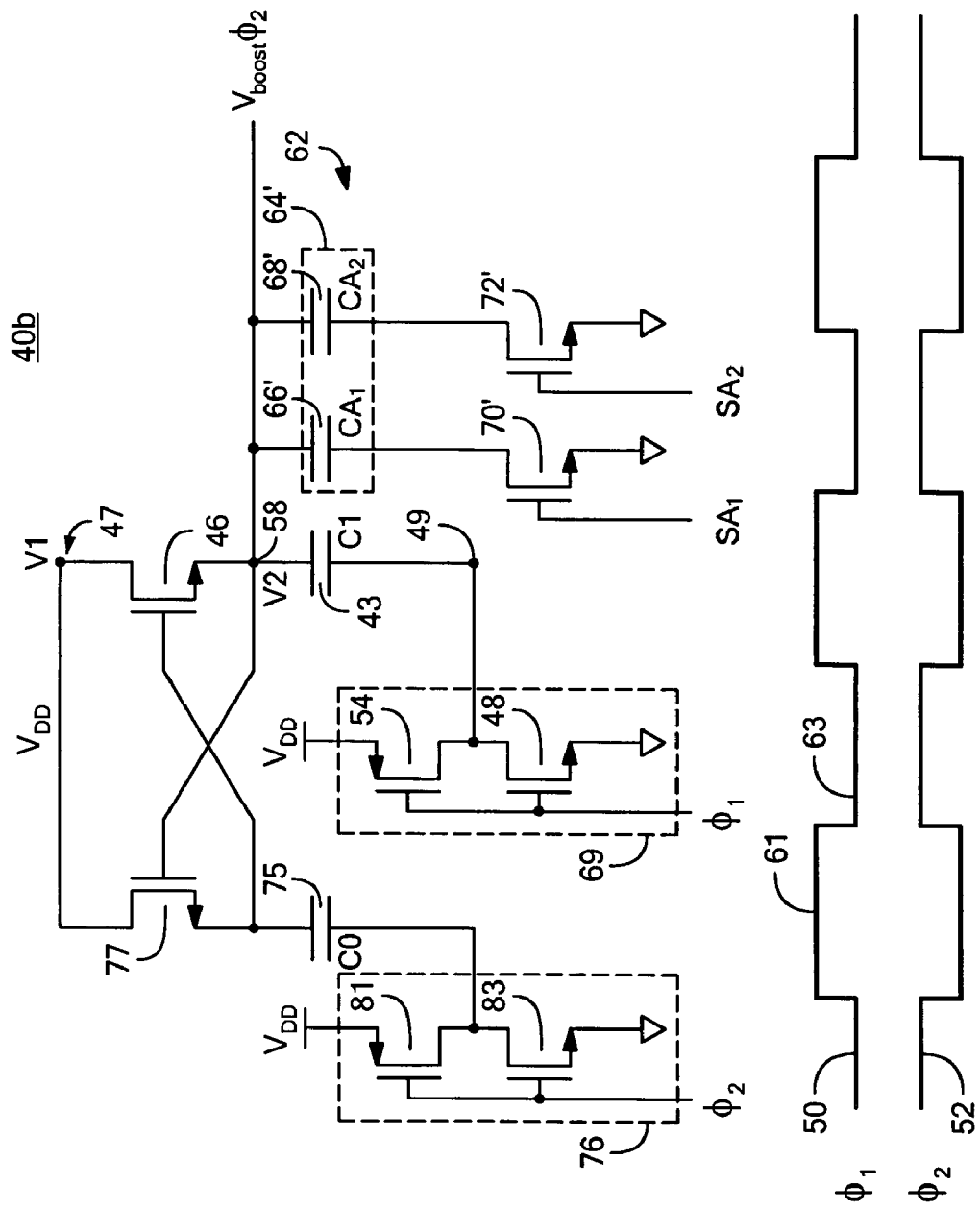
FIG. 5 is a schematic circuit diagram showing in further detail one example of the components of the programmable clock booster system shown in FIG. 4.

FIG. 5, where like parts have been given like numbers, shows one exemplary embodiment of programmable clock booster system 40b in accordance with this invention. In this example V1 47 is equal to $V_{DD}$ and is connected through NMOS switching device 46. V2 58 is also equal to $V_{DD}$ which is connected through PMOS switching device 54. In this example, switching devices 48 and 54 are NMOS and PMOS devices, respectively, configured as inverter 69. Switching device 48 is enabled when $\phi_1$ signal 50 is high, indicated at 61, and switching device 54 is enabled when $\phi_1$ signal 50 is low, indicated at 63. Programmable clock booster system 40b also includes NMOS device 77 that is cross-coupled to switching device 46. Sampling capacitor 75 (CO) is connected to NMOS device 77 and inverter 76. Inverter 76 is responsive to $\phi_2$ signal 52 and includes PMOS device 81 and NMOS device 83. In this design, capacitor array 64' includes switched capacitors 66' and 68' with switching devices 71' and 72' that include NMOS devices.

Figure 6:
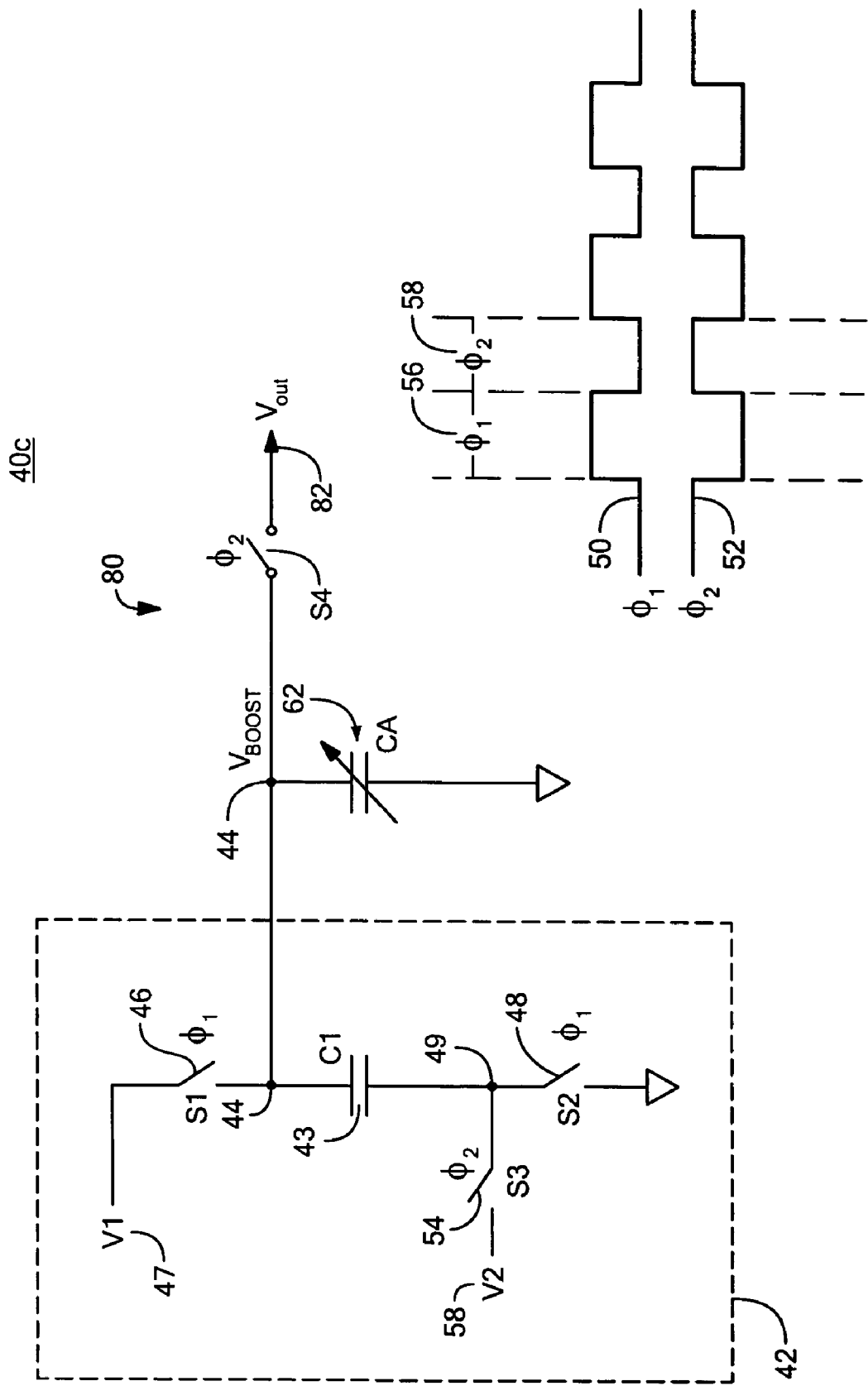
FIG. 6 is a simplified schematic circuit diagram showing a series-pass switch connected to the programmable clock booster system shown in FIG. 3.
Figure 7A:
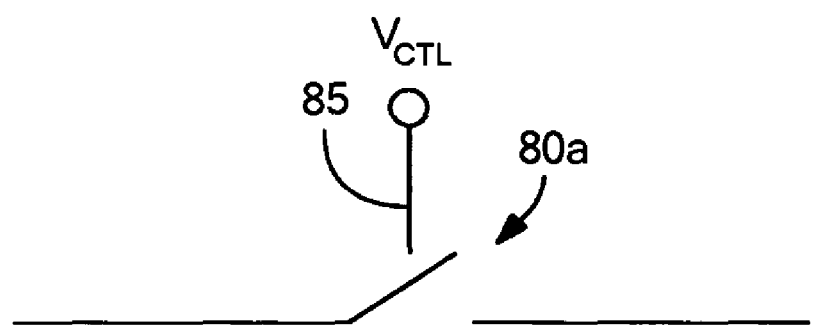
FIGS. 7A-7C are schematic circuit diagrams showing various embodiments of the series-pass switch shown in FIG. 6.
Figure 7B:
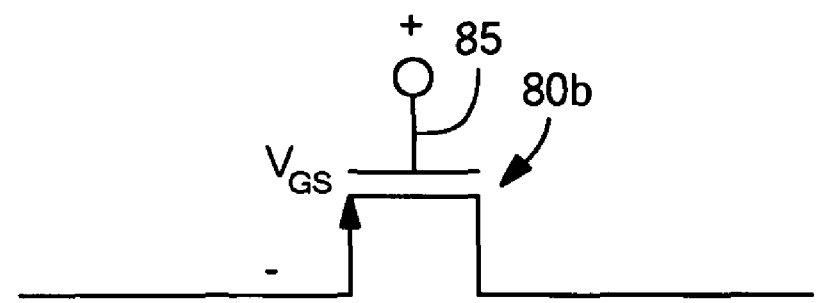
Figure 7C:
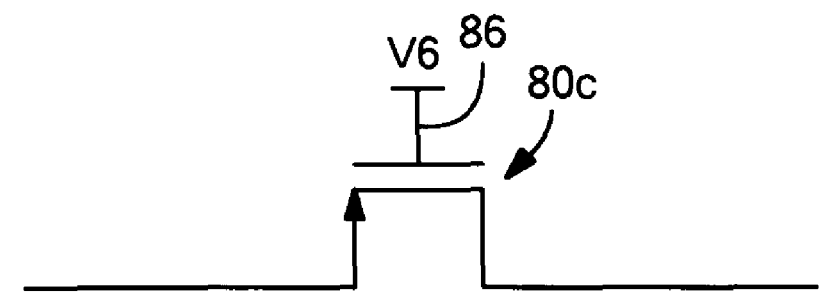

Programmable clock booster system 40c, FIG. 6, where like parts have been given like numbers includes clock booster circuit 42 programmable capacitor circuit 62 described above connected to series-pass switch 80. Series-pass switch 80 prevents the programmable boosted voltage, $V_{BOOST}$, at node 44 from passing to output node 82 in the first phase, $\phi_1$ and allows the programmable boosted voltage at node 44 to pass to output node 82 in the second phase, $\phi_2$. In one design, series-pass switch 80 includes a voltage controlled switch, such as voltage controlled switch 80a, FIG. 7A, that is responsive to a control voltage, $V_{CTL}$, applied at control terminal 85 that disables voltage controlled switch 80a in $\phi_1$ and enables voltage controlled switch 80a in $\phi_2$. Series-pass switch 80 may include voltage controlled switch 80b, FIG. 7B, that is a transconductance device, such as a PMOS or NMOS type device, responsive to the control voltage applied at control terminal 85 that similarly disables voltage controlled switch 80b in $\phi_1$ and enables voltage controlled switch 80b in $\phi_2$. In one preferred design, series-pass switch 80 includes voltage controlled switch 80c, FIG. 7C, e.g., a PMOS device, that is responsive to a predetermined voltage, $V_G$, applied to gate 86 that ensures voltage controlled switch 80c is off in $\phi_1$ and enabled in $\phi_2$.

Figure 8:
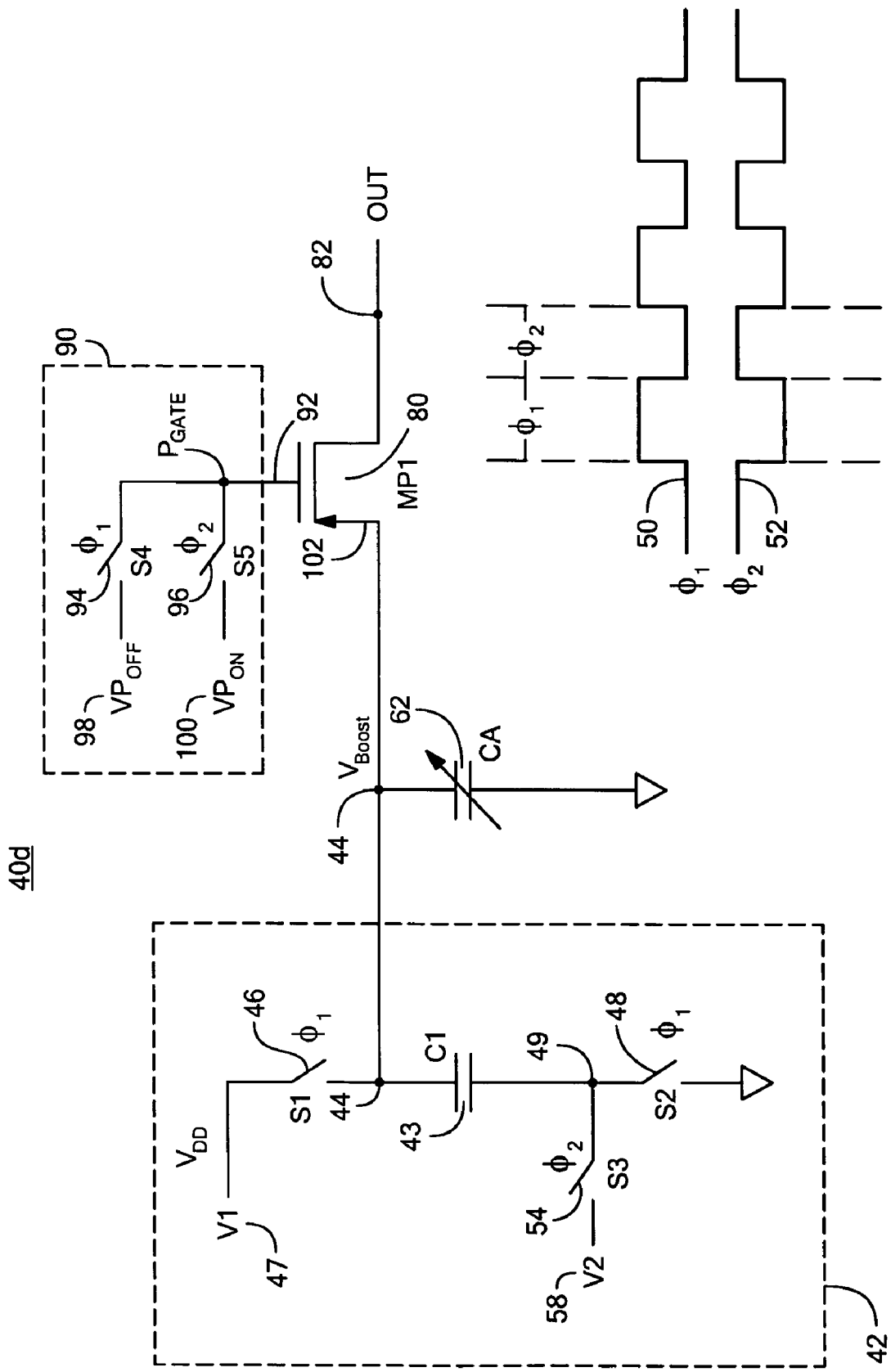
FIG. 8 is a schematic circuit diagram of another embodiment of the programmable clock booster system of this invention including a gate drive circuit connected to a series-pass switch.

Programmable clock booster system 40d, FIG. 8, where like parts have been given like numbers, includes clock booster circuit 42 and programmable capacitor circuit 62 as described above that provides a programmable boosted voltage, $V_{BOOST}$ at node 44. Similarly, series-pass switch 80, e.g., a PMOS device, is connected to programmable capacitor circuit 62. Series-pass switch 80 may also be an NMOS or similar type device.

Gate drive circuit 90 is connected to gate 92 of series-pass switch 80 and adjusts the voltage at gate 92 to a first predetermined voltage, e.g., $VP_{OFF}$ 98, that disables series-pass switch 80 in a first phase, $\phi_1$. Gate drive circuit 90 also adjusts the voltage at gate 92 to a second predetermined voltage, e.g., $VP_{ON}$ 100, in a second phase, $\phi_2$ that ensures series-pass switch 80 is enabled in $\phi_2$. $VP_{ON}$ 100 is typically less than or equal to the minimum programmable boosted voltage minus the threshold voltage ($V_{TH}$) of series-pass switch 80 that is needed to enable series-pass switch 80. Gate drive circuit 90 typically includes voltage controlled switching devices 94 and 96 connected to voltage $VP_{OFF}$ 98 and $VP_{ON}$ 100, respectively. Switching devices 94 and 96 are responsive to $\phi_1$ signal 50 and $\phi_2$ signal 52, respectively, and set the voltage at gate 92 to $VP_{OFF}$ 98 in $\phi_1$ and to $VP_{ON}$ 100 in $\phi_2$, as described below.

In operation, during $\phi_1$ switching device 94 is on (closed) and switching device 96 is off (open) resulting in gate 92 being connected to the voltage $VP_{OFF}$ 98. $VP_{OFF}$ 98 is set to any desired voltage, e.g., $V_{DD}$ described above, that ensures series-pass switch 80 is off during $\phi_1$. During $\phi_2$, source 102 of series-pass switch 80 is raised to the programmable boosted voltage, $V_{BOOST}$ at node 44. Switching device 96 is closed and the voltage at gate 92 is set to $VP_{ON}$ 100 to enable series-pass switch 80. The result is that gate drive circuit 90 ensures series-pass switch 80 is off in $\phi_1$ and prevents $V_{BOOST}$ at node 44 from passing to output node 82 and ensures series-pass switch 80 is on in $\phi_2$ allowing $V_{BOOST}$ to pass to output node 82.

Figure 9A:
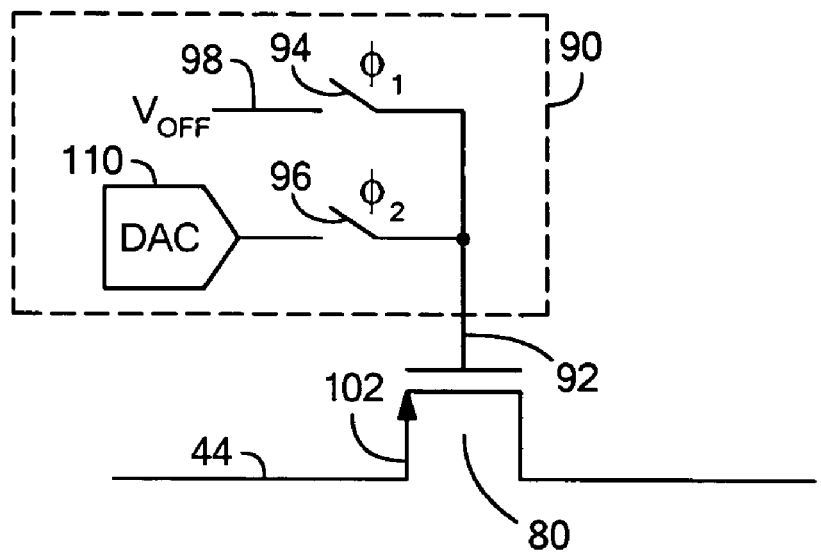
FIGS. 9A and 9B are schematic circuit diagrams showing various examples of the gate drive circuit switch shown in FIG. 8.
Figure 9B:
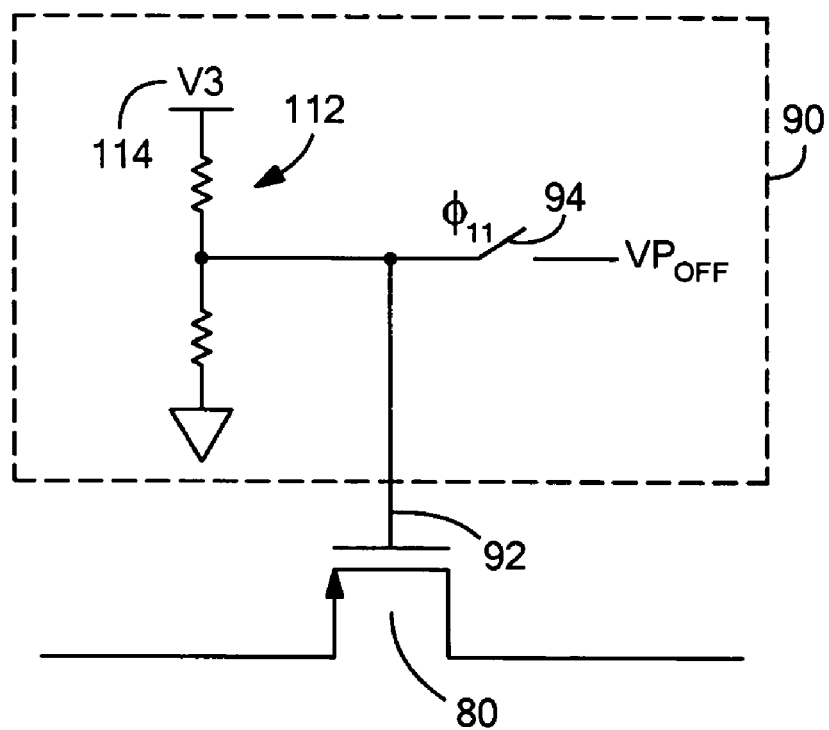

Gate drive circuit 90 may include programmable digital-to-analog converter (DAC) 110, FIG. 9A, where like parts have been given like numbers, connected to switching device 96. DAC 110 is programmed to generate any desired programmable value of $VP_{ON}$ needed to enable series-pass switch 80 in $\phi_2$. Gate drive circuit 90 may also include resistive divider circuit 112, FIG. 9B, that is responsive to a voltage V3 114 that similarly provides a desired voltage for $VP_{ON}$ to enable series-pass switch 80 in $\phi_2$.

Figure 10:
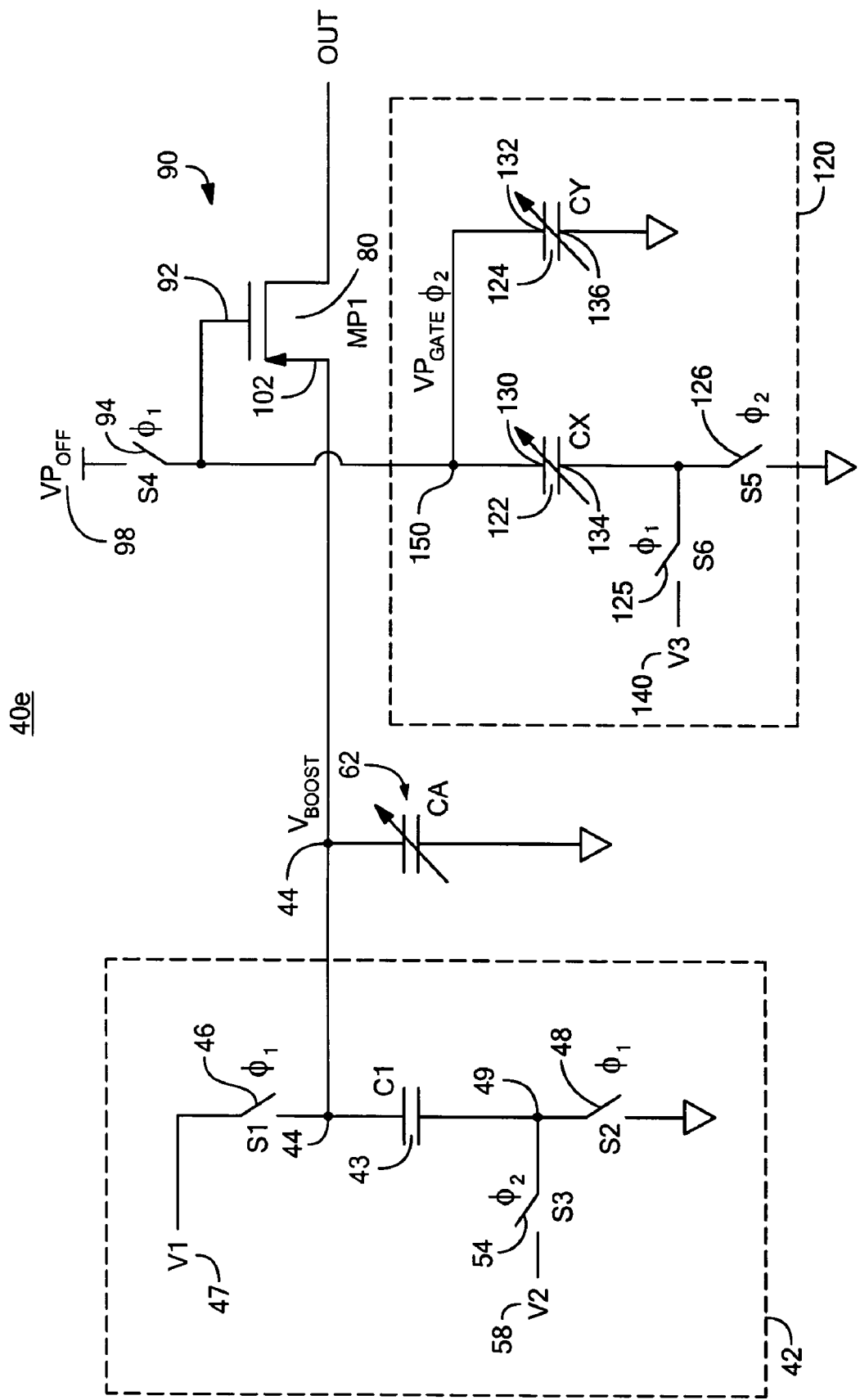
FIG. 10 is a schematic circuit diagram of another embodiment of the gate drive circuit shown in FIG. 8.

Programmable clock booster system 40e, FIG. 10, where like parts have been given like numbers, includes clock booster circuit 42 programmable capacitor circuit 62 and series-pass switch 80, e.g., as PMOS or similar type device, as discussed above. In this embodiment, gate drive circuit 90 includes voltage controlled switching device 94 that sets the voltage at gate 92 to a first predetermined voltage, e.g., $VP_{OFF}$ 98, in $\phi_1$ to ensure series-pass switch 80 is off. Gate drive circuit 90 also includes programmable capacitor divider circuit 120 connected to gate 92 of series-pass switch 80 that adjusts the voltage at gate 92 to a second predetermined voltage, e.g., $VP_{GATE\phi_2}$, in $\phi_2$ that enables series-pass switch 80. Programmable capacitor divider circuit 120 typically includes capacitor 122 ($C_X$) and capacitor 124 ($C_Y$) and switching devices 125 and 126 connected to bottom plate 134 of capacitor 122 ($C_X$). The voltage switching on the bottom plate 134 of capacitor 122 and the capacitive divider action of capacitors 122 and 124 (discussed below) adjusts the voltage at gate 92 required to enable series-pass switch 80 in $\phi_2$. One or both of capacitors 122 ($C_X$) and 124 ($C_Y$) may be programmable and may include at least two switched capacitors.

In operation, during $\phi_1$ voltage controlled switching device 94 is closed and the voltage $VP_{OFF}$ 98 is connected to gate 92 of series-pass switch 80, e.g., a PMOS device. $VP_{OFF}$ is set to a voltage that ensures series-pass switch 80 is off during $\phi_1$. During $\phi_1$, top plates 130 and 132 of capacitors 122 ($C_X$) and 124 ($C_Y$), respectively, are charged to $VP_{OFF}$ 98 and bottom plate 134 of capacitor 122 ($C_X$) is set to the voltage V3 140. Bottom plate 136 of capacitor 124 ($C_Y$) is connected to ground. At the end of $\phi_1$, switching device 94 opens and the voltages V3 140 and $VP_{OFF}$ 98 are sampled by capacitors 122 ($C_X$) and 124 ($C_Y$). During $\phi_2$, source 102 of series-pass switch 80 is boosted to the programmable boosted voltage, $V_{BOOST}$, at node 44. Bottom plate 134 of capacitor 122 ($C_X$) is pulled to ground via switching device 126. The voltage at node 150, $VP_{GATE}$, then drops due to the capacitive divider action of programmable capacitors 122 ($C_X$) and 124 ($C_Y$). The final voltage at node 150, $VP_{GATE\phi_2}$, at the end of $\phi_2$ is therefore equal to:

$$VP_{GATE_{\phi_2}} = VP_{OFF} - V3\left(\frac{C_X}{C_X + C_Y}\right) \quad (2)$$

where $C_X$ is the capacitance of capacitor 122 and $C_Y$ is the capacitance of capacitor 124. The result is that source 102 of PMOS series-pass switch 80 increases to the programmable boosted voltage, $V_{BOOST}$ at node 44, while the gate 92 decreases to $VP_{GATE\phi_2}$ so that the PMOS series-pass switch 80 is turned on during $\phi_2$. As discussed above, one or both of capacitors 122 and 124 may be programmable, and may include an array of switched capacitors. This provides the ability to vary the voltage at $VP_{GATE\phi_2}$ over a programmable range of voltages. The capacitive values of capacitors 122 ($C_X$) and 124 ($C_Y$) can be programmed so that the voltage $VP_{GATE\phi_2}$ tracks the programmable boosted voltage, $V_{BOOST}$, as determined by the capacitance of programmable capacitor circuit 62 (CA) described above. The result is that $V_{BOOST}$–$VP_{GATE\phi_2}$ will be constant thus providing a constant $V_{GS}$ turn on voltage for PMOS series-pass switch 80.

Figure 11:
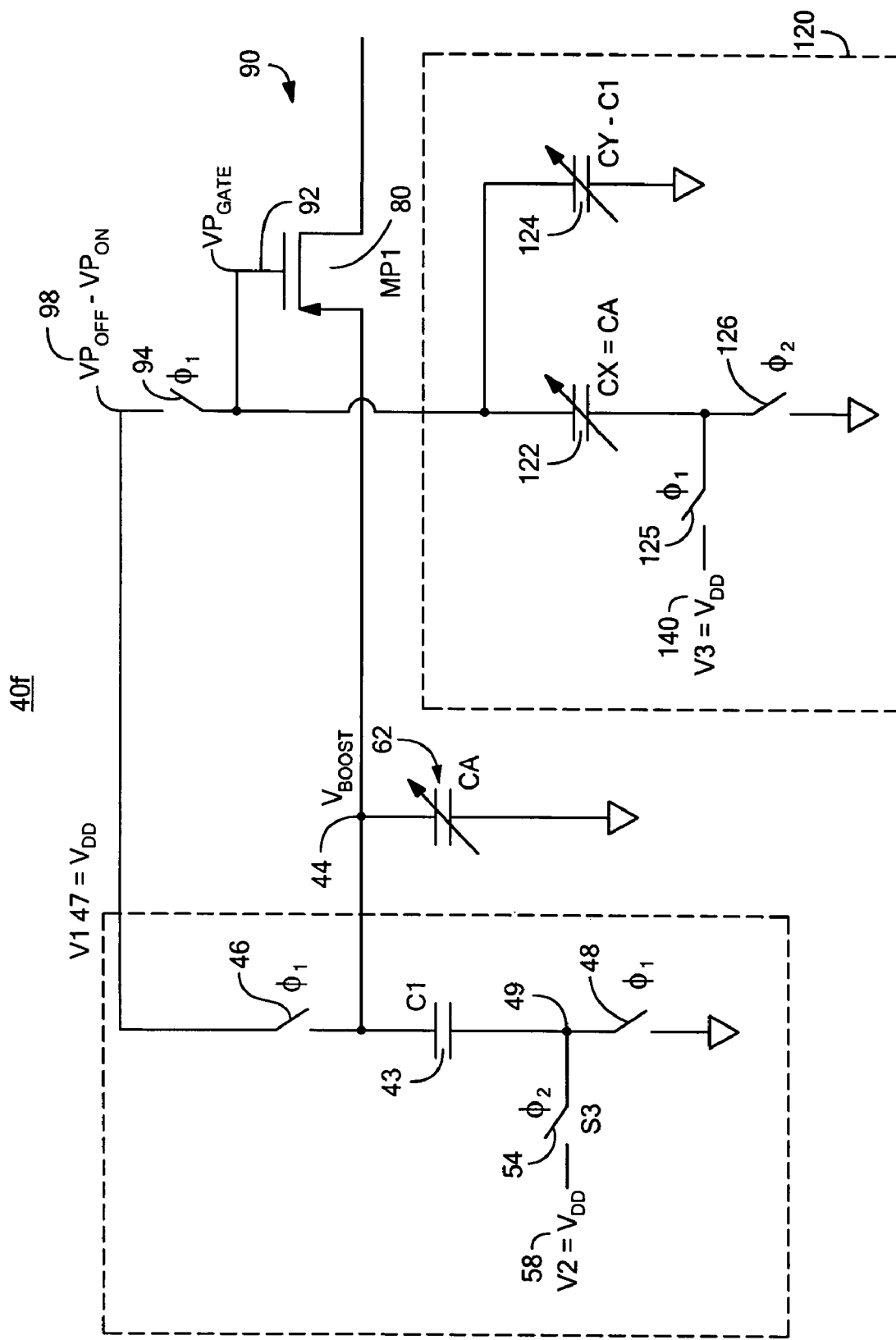
FIG. 11 is a schematic circuit diagram of another embodiment of the programmable clock booster shown in FIG. 10 that provides a constant gate-to-source voltage on the series-pass switch.

Programmable clock booster system 40f, FIG. 11, where like parts have been given like numbers, shows an example, in which the voltages V1 47, V2 58, V3 140 and $VP_{OFF}$ 98, discussed above, are all set to a common voltage $V_{DD}$. In this example, the capacitances of boost capacitor 43 (C1), programmable capacitor circuit 62 and gate drive circuit 90 are selected so that system 40f generates a constant gate-to-source voltage, $V_{GS}$, on series-pass switch 80 over variations in the programmable boosted voltage, $V_{BOOST}$. In this example, the capacitance of capacitor 124 ($C_Y$) is selected (or programmed) to be equal to the capacitance of boost capacitor 43 (C1) and the capacitance of capacitor 122 ($C_X$) is selected (or programmed) to be equal to the capacitance of programmable capacitor circuit 62 (CA). Accordingly, using the capacitor relationships discussed above, $VP_{GATE\phi_2}$ will track $V_{BOOST}$ thus maintaining a constant $V_{GS}$ for PMOS device 80 over the full programming range of $V_{BOOST}$.

Figure 12:
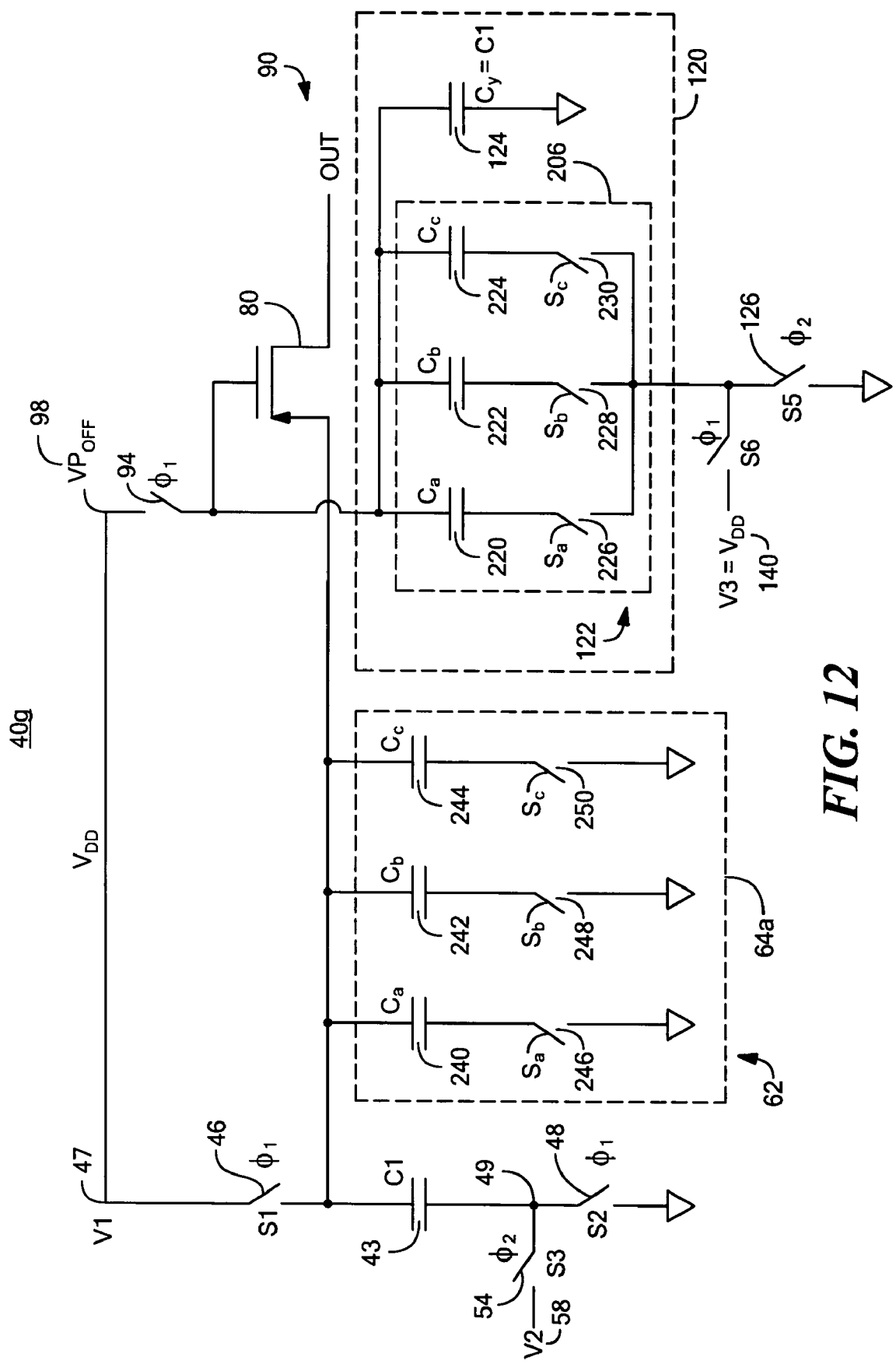
FIG. 12 is a schematic circuit diagram showing in further detail the components of the programmable capacitor circuit and the gate drive circuit shown in FIG. 11.

Programmable clock booster system 40g, FIG. 12, where like parts have been given like numbers, shows an example similar to programmable clock booster system 40f above in which the voltages V1 47, V2 58, V3 140 and $VP_{OFF}$ 98 are set to $V_{DD}$. In this example programmable capacitor circuit 62 includes capacitor array 64a with switched capacitors 240 ($C_a$), 242 ($C_b$), 244 ($C_c$) with switching devices 246 ($S_a$), 248 ($S_b$), and 250 ($S_c$), respectively. Gate drive circuit 90 includes programmable capacitor circuit 120 with capacitor 122 ($C_X$) configured as programmable capacitor array 206 with switched capacitors 220 ($C_a$), 222 ($C_b$), 224 ($C_c$) that are programmed with switching devices 226 ($S_a$), 228 ($S_b$) and 230 ($S_c$). Gate drive circuit 90 also includes capacitor 124 ($C_Y$) and voltage controlled switching device 94. When the selected or programmed capacitance of capacitor array 64a are matched to the selected or programmed capacitance of capacitor array 206 and capacitor 124 ($C_Y$) is matched to boost capacitor 43 (C1), system 40g provides a constant $V_{GS}$ on series-pass switch 80 that is equal to $-V_{DD}$ in $\phi_2$ over the full programmable boosted voltage range.

Figure 13:
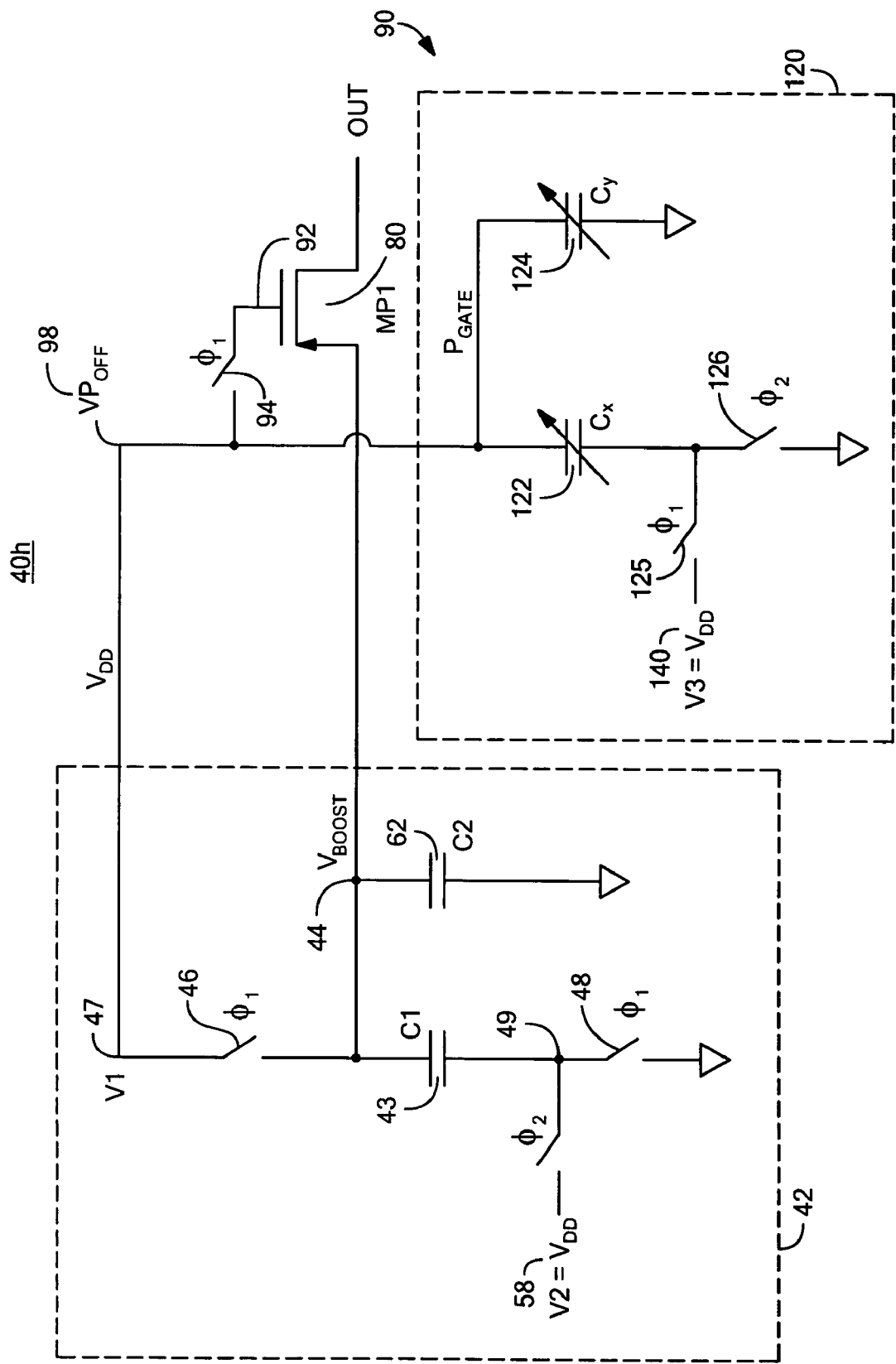
FIG. 13 is a schematic circuit diagram of another embodiment of the clock booster system in accordance with this invention.

Although as described above with reference to FIGS. 3-12, programmable clock booster system 40 includes programmable capacitor circuit 62 that provides a programmable boosted voltage, $V_{BOOST}$, this is not a necessary limitation of this invention. Clock booster system 40h, FIG. 13, where like parts have been given like numbers, may include a clock booster circuit 42 as described above capacitor circuit 62a that provides a variable boosted voltage at node 44 between V1 47 and the sum of V1 47 plus V2 58 that is determined by the capacitance of boost capacitor 43 and capacitor circuit 62a. System 40h also includes a series-pass switch 80 and gate drive circuit 90 that may be programmable as discussed above, that include similar devices and operate similarly as described above. Also as described above, selecting the capacitance of boost capacitor 43 (C1) to be equal to the capacitance of capacitor 124 ($C_Y$) and the capacitance of capacitor circuit 62a (C2) to be equal to the capacitance of capacitor 122 ($C_X$) results in a constant $V_{GS}$ on series-pass switch 80 in $\phi_2$.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A programmable clock booster system comprising:
    a clock booster circuit including at least one boost capacitor connected between a first node and a second node for sampling an input voltage in a first phase and applying a boosting voltage to said second node during a second phase;
    a programmable attenuator capacitor circuit connected to said first node for sampling the input voltage in the first phase and providing a programmable boosted voltage having a voltage level between the input voltage and the sum of the input voltage and the boosting voltage on said first node during said second phase;
    a series-pass switch connected to said programmable attenuator capacitor circuit for preventing said programmable boosted voltage to pass to an output node in said first phase and allowing said programmable boosted voltage to pass to said output node in said second phase, said series-pass switch includes a voltage controlled switch responsive to a control voltage that enables or disables said series-pass switch; and a gate drive circuit including at least first and second switched capacitors connected to a gate of said series-pass switch for adjusting the voltage at said gate to a first predetermined voltage that disables said series-pass switch in said first phase and for adjusting the voltage at said gate to a second predetermined voltage that enables said series-pass switch in said second phase, wherein the first and second switched capacitors adjust the voltage at said gate to track the boosting voltage based on the programmable attenuator capacitor circuit.

2. The system of claim 1 in which said programmable attenuator capacitor circuit includes a capacitor array including at least two switched capacitors.

3. The system of claim 2 in which said programmable boosted voltage is determined by the capacitance of said at least one boost capacitor and the total capacitance of the enabled capacitors of said capacitor array.

4. The system of claim 1 in which said series-pass switch includes at least one transconductance component chosen from the group consisting of a PMOS device and an NMOS device.

5. The system of claim 4 in which said series-pass switch includes a PMOS device.

6. The system of claim 5 in which a predetermined voltage is applied to a gate of said PMOS device that ensures said PMOS device is off in said first phase and on in said second phase.

7. The system of claim 1 in which said gate drive circuit includes a plurality of switching devices connected to a plurality of voltage sources.

8. The system of claim 7 in which said gate drive circuit includes a programmable digital-to-analog converter.

9. The system of claim 1 in which said gate drive circuit includes a resistive divider circuit.

10. A programmable clock booster system comprising:
a clock booster circuit including at least one boost capacitor connected between a first node and a second node for sampling an input voltage in a first phase and applying a boosting voltage to said second node during a second phase;
a programmable attenuator capacitor circuit connected to said first node for sampling the input voltage in the first phase and providing a programmable boosted voltage having a voltage level between the input voltage and the sum of the input voltage and the boosting voltage on said first node during said second phase;
a series-pass switch connected to said programmable attenuator capacitor circuit for preventing said programmable boosted voltage to pass to an output node in said first phase and allowing said programmable boosted voltage to pass to said output node in said second phase, said series-pass switch includes a voltage controlled switch responsive to a control voltage that enables or disables said series-pass switch; and
a gate drive circuit connected to a gate of said series-pass switch for adjusting the voltage at said gate to a first predetermined voltage that disables said series-pass switch in said first phase and for adjusting the voltage at said gate to a second predetermined voltage that enables said series-pass switch in said second phase,
wherein said gate drive circuit further includes a voltage controlled switching device connected to said gate of said series-pass switch for setting the voltage on said gate to said first predetermined voltage in said first phase and a capacitor divider circuit connected to said gate for adjusting the voltage on said gate to said second predetermined voltage in said second phase.

11. The system of claim 10 in which said capacitive divider circuit includes at least first and second capacitors.

12. The system of claim 11 in which one or both of said first and second capacitors includes a programmable capacitor.

13. The system of claim 12 in which said programmable capacitor includes a capacitor array having at least two switched capacitors.

14. The system of claim 11 in which said second predetermined voltage is determined by the capacitance of said first and second capacitors.

15. The system of claim 12 in which said second predetermined voltage is determined by the capacitance of said first and second capacitors.

16. The system of claim 12 in which the capacitance of said first and second capacitors is chosen so that said second predetermined voltage tracks said boosted voltage.

17. The system of claim 16 in which said input voltage and the capacitance of said boost capacitor, said programmable capacitor circuit and said gate drive circuit are selected so that said gate drive circuit generates a constant gate to source voltage on said series-pass switch over variations in said programmable boosted voltage.

18. A programmable clock booster system comprising:
a clock booster circuit including at least one boost capacitor connected between a first node and a second node for sampling an input voltage in a first phase and applying a boosting voltage at said second node in a second phase;
a capacitor circuit connected to said first node for sampling the input voltage in the first phase and providing a variable boosted voltage between said input voltage and the sum of said input voltage and said boosting voltage;
a series-pass switch connected to said capacitor circuit for preventing said variable boosted voltage to pass to an output node in said first phase and allowing said variable boosted voltage to pass to said output node in said second phase; and
a gate drive circuit including at least first and second switched capacitors connected to a gate of said series-pass switch for adjusting the voltage at said gate to a first predetermined voltage that disables said series-pass switch in said first phase and for adjusting the voltage at said gate to a second predetermined voltage that enables said series-pass switch in said second phase, wherein the first and second switched capacitors adjust the voltage at said gate to track the boosted voltage based on the capacitor circuit.

19. The system of claim 18 in which said capacitor circuit includes a capacitor array including at least two switched capacitors.

20. The system of claim 18 in which said variable boosted voltage is determined by the capacitance of said at least one boost capacitor and the total capacitance of the enabled capacitors of said capacitor array.

21. The system of claim 18 in which said series-pass switch includes a voltage controlled switch responsive to a control voltage that enables or disables said series-pass switch.

22. The system of claim in which said series-pass switch includes at least one transconductance component chosen from the group consisting of a PMOS device and an NMOS device.

23. The system of claim 22 in which said series-pass switch includes a PMOS device.

24. The system of claim 23 in which a predetermined voltage is applied to a gate of said PMOS device that ensures said PMOS device is off in said first phase and on in said second phase.

25. The system of claim 18 in which said gate drive circuit further includes a voltage controlled switching device connected to said gate of said series-pass switch for setting the voltage on said gate to said first predetermined voltage in said first phase and a capacitor divider circuit connected to said gate for adjusting the voltage on said gate to said second predetermined voltage in said second phase.

26. The system of claim 25 in which said capacitive divider circuit includes at least first and second capacitors.

27. The system of claim 26 in which one or both of said first and second capacitors includes a programmable capacitor.

28. The system of claim 27 in which said programmable capacitor includes a capacitor on array having at least two switched capacitors.

29. The system of claim 26 in which said second predetermined voltage is determined by the capacitance of said first and second capacitors.

30. The system of claim 27 in which said second predetermined voltage is determined by the capacitance of said first and second capacitors.

31. The system of claim 27 in which the capacitance of said first and second capacitors is chosen so that said second predetermined voltage tracks said variable boosted voltage.

32. The system of claim 31 in which said input voltage and the capacitance of said boost capacitor, said capacitor circuit and said gate drive circuit are selected so that said gate drive circuit generates a constant gate to source voltage on said series-pass switch over variations in said variable boosted voltage.

* * * * *